(12) United States Patent
Kirkland

(10) Patent No.: US 6,665,947 B2
(45) Date of Patent: Dec. 23, 2003

(54) FLAT PANEL SAW AND ROUTER GUIDE

(75) Inventor: Edward E. Kirkland, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 0 days.

(21) Appl. No.: 10/122,160

(22) Filed: Apr. 15, 2002

(65) Prior Publication Data

US 2003/0192192 A1 Oct. 16, 2003

(51) Int. Cl.[7] ............................................. B23B 49/00
(52) U.S. Cl. ..................... 33/640; 33/613; 33/626; 33/628; 83/745
(58) Field of Search ................. 33/640, 641, 613, 33/626, 628, 630, 42, 427; 83/745, 574, 485, 471.2, 438, 440, 441, 442, 565, 746, 743, 761; 269/166, 221

(56) References Cited

U.S. PATENT DOCUMENTS

| | | | | | |
|---|---|---|---|---|---|
| 3,127,680 A | * | 4/1964 | Brichard et al. | ............. | 33/32.3 |
| 3,827,468 A | * | 8/1974 | Markham | ..................... | 33/443 |
| 4,394,800 A | * | 7/1983 | Griset | ............................. | 33/42 |
| 4,490,920 A | * | 1/1985 | Griset | ............................. | 33/42 |
| 4,509,398 A | * | 4/1985 | Mason | ......................... | 83/745 |
| 5,148,730 A | * | 9/1992 | McCaw | ........................ | 83/745 |
| 5,207,007 A | * | 5/1993 | Cucinotta et al. | ............. | 33/640 |
| 5,348,276 A | * | 9/1994 | Blacker | ........................ | 269/88 |
| 5,442,984 A | * | 8/1995 | Tate | .......................... | 83/471.2 |
| 5,823,084 A | * | 10/1998 | Ramey | ......................... | 83/415 |
| 5,964,041 A | * | 10/1999 | Daniel | ........................ | 83/745 |
| 6,062,122 A | * | 5/2000 | Niemczyk | ..................... | 83/745 |
| 6,079,309 A | * | 6/2000 | Molburg | ...................... | 83/745 |
| 6,484,767 B2 | * | 11/2002 | Cameron | ..................... | 83/574 |
| 6,505,411 B2 | * | 1/2003 | Gooden | ......................... | 33/42 |
| 6,536,752 B1 | * | 3/2003 | Gatanas | ........................... | 269/6 |

* cited by examiner

Primary Examiner—Diego Gutierrez
Assistant Examiner—Yaritza Guadalupe
(74) Attorney, Agent, or Firm—Wiley Horton

(57) ABSTRACT

A marking and cutting guide particularly adapted for use on large flat panels—such as pieces of plywood. The invention clamps onto large panels and remains in place while the user either uses it to mark a cutting line or uses is as a saw guide. Adjustment means are provided so that the user can easily adapt the device to panels of different sizes. Clamping means are provided so that the user can easily clamp the device to a panel.

10 Claims, 14 Drawing Sheets

FLAT PANEL SAW AND ROUTER GUIDE

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX Not Applicable

BACKGROUND OF THE INVENTION

1. Field of the Invention.

This invention relates to the field of marking and cutting panels of wood or other materials. More specifically, the invention comprises a device which clamps to large flat panels and provides a true perpendicular edge for marking and/or cutting.

2. Description of the Related Art.

In the field of carpentry it is often necessary to make perpendicular cuts in large, flat panels. This is particularly true in cabinet making, where the cuts must be especially precise. Cabinets are typically made from large panels of highly finished plywood. These panels typically measure 4 feet by 8 feet. Because the panels are made in a rapid industrial process, the four edges bounding the panels are not perfectly perpendicular. Most cabinet cuts are therefore made by designating one edge as the reference edge (or "true" edge), and thereafter referencing all angles and cuts off of that edge.

A carpentry square is commonly used to mark perpendicular lines extending inward from the true edge. Unfortunately, carpentry squares are typically only 26 inches long on their longest side. This means they cannot mark a full cut across a 4 foot wide panel. They also must be held firmly against the reference edge in order to give accurate results. As those familiar with the art will know, it is difficult to hold a framing square in place with one hand while marking with the other—especially when the mark must be carried over a long distance. It would be preferable to have a square which could be secured in place, leaving both hands free for the marking process.

It would also be preferable to have a marking square which can actually serve as a saw guide. The prior art square cannot be used as a saw guide, since it is not thick enough to adequately guide the saw and since it will not remain fixed in place when force is placed against it.

The known devices for marking and cutting large panels are therefore limited in that they:

1. Cannot mark a full cut across a 4 foot panel;
2. Cannot be fixed in place to leave both the user's hands free; and
3. Cannot serve as a saw guide.

BRIEF SUMMARY OF THE INVENTION

The present invention is a carpentry marking and cutting guide particularly adapted for use on large flat panels—such as pieces of plywood. The invention clamps onto large panels and remains in place while the user either uses it to mark a cutting line or uses it as a saw guide. Adjustment means are provided so that the user can easily adapt the device to panels of different sizes. Clamping means are provided so that the user can easily clamp the device to a panel.

Accordingly, the present invention seeks to provide a carpentry marking and cutting guide which:

1. Can mark a full cut across a 4 foot panel;
2. Can be fixed in place to leave both the user's hands free; and
3. Can serve as a saw guide.

Figure 1:
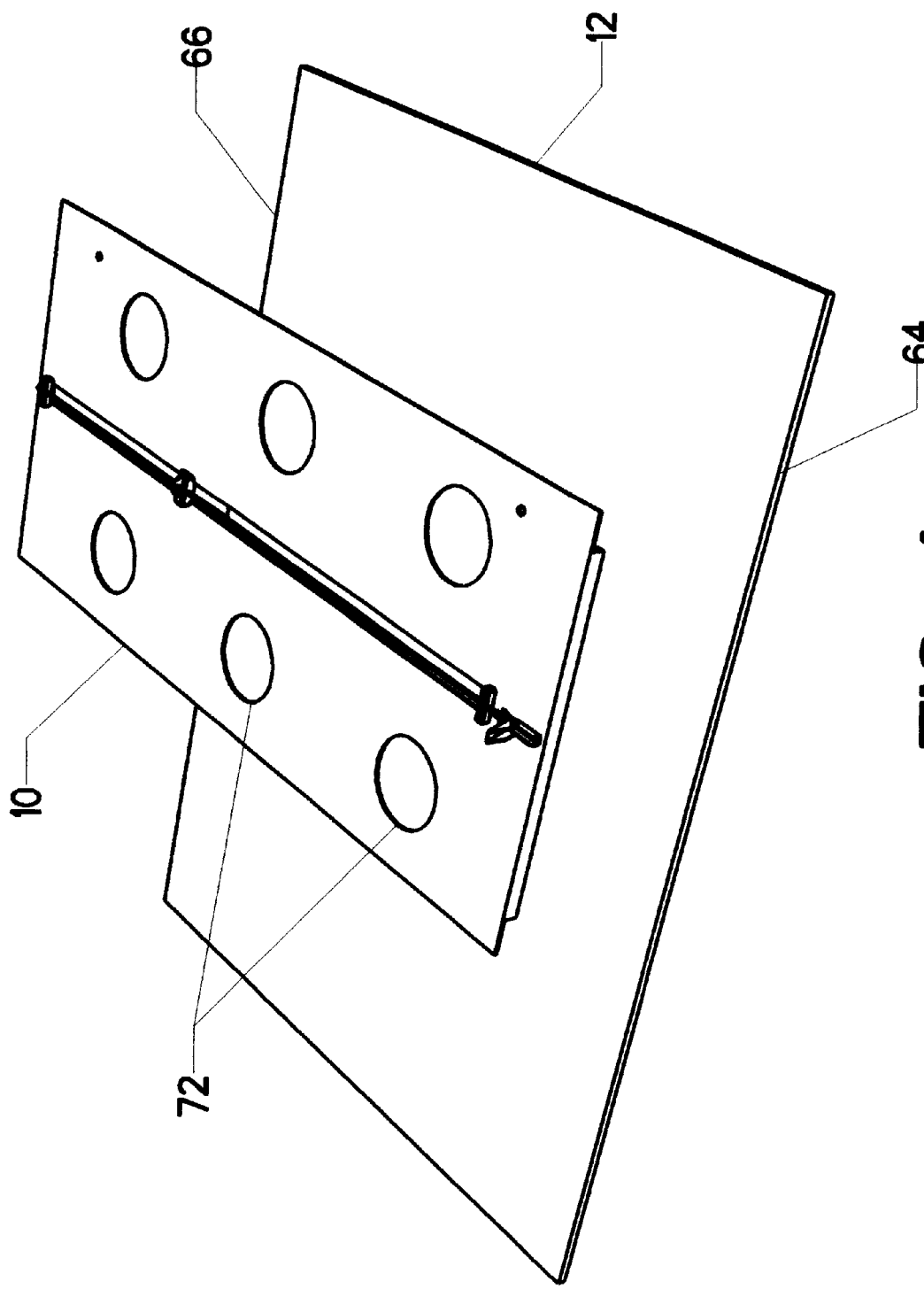
FIG. 1 is a perspective view, showing the proposed invention.

| REFERENCE NUMERALS IN THE DRAWINGS | | | |
|---|---|---|---|
| 10 | square | 12 | plywood panel |
| 14 | edge guide | 16 | saw |
| 18 | cut | 20 | spacer panel |
| 22 | flat panel | 24 | slot |
| 26 | fixed stop | 28 | clamp body |
| 30 | first tail stop | 32 | clamp rod |
| 34 | spring retainer | 36 | clamp spring |
| 38 | toggle | 40 | drag link |
| 42 | coupler | 44 | through hole |
| 46 | release lever | 48 | lock spring |
| 50 | panel groove | 52 | clamping surface |
| 54 | fulcrum | 56 | lever hole |
| 58 | lever cavity | 60 | fixed base |
| 62 | pin | 64 | reference edge |
| 66 | back edge | 68 | second tail stop |
| 70 | finger notch | 72 | large hole |

DESCRIPTION OF THE INVENTION

Figure 2:
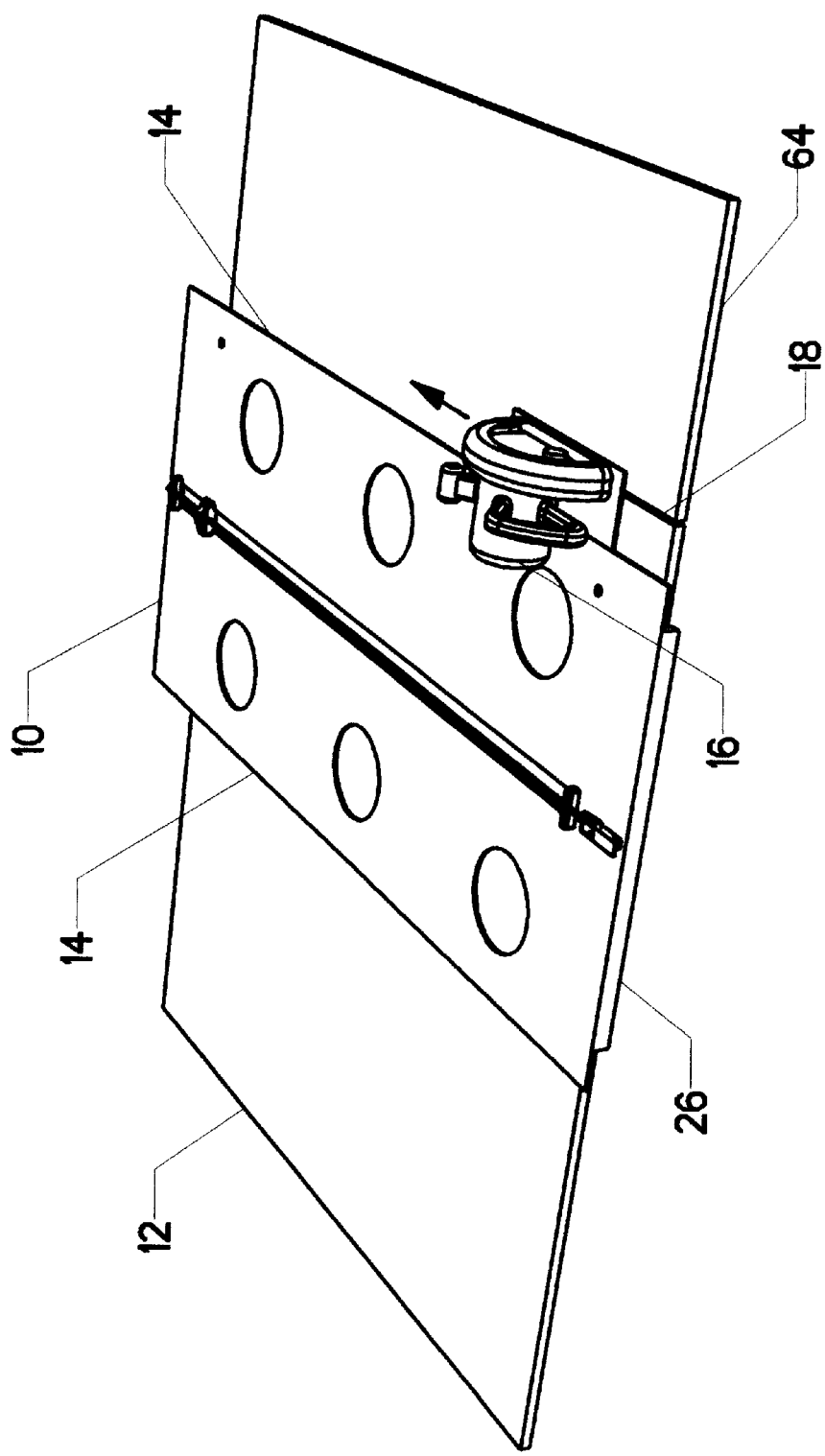
FIG. 2 is a perspective view, showing the operation of the invention.

FIG. 1 shows square 10 in its most common application—marking a plywood panel 12. Once locked in position—as shown—edge guide 14 is used as a reference to scribe a line across the upper surface of plywood panel 12 which is perfectly perpendicular to reference edge 64. FIG. 2 shows an alternate use, wherein edge guide 14 is used to guide saw 16 in making cut 18. When used in this fashion, the user may elect to skip the step of scribing a line. Cut 18 will be perfectly perpendicular to reference edge 64. Those skilled in the art will realize that either of the two guide edges 14 can be used. The user will select the correct edge depending on whether a right hand or a left hand cut is to be made.

Figure 3:
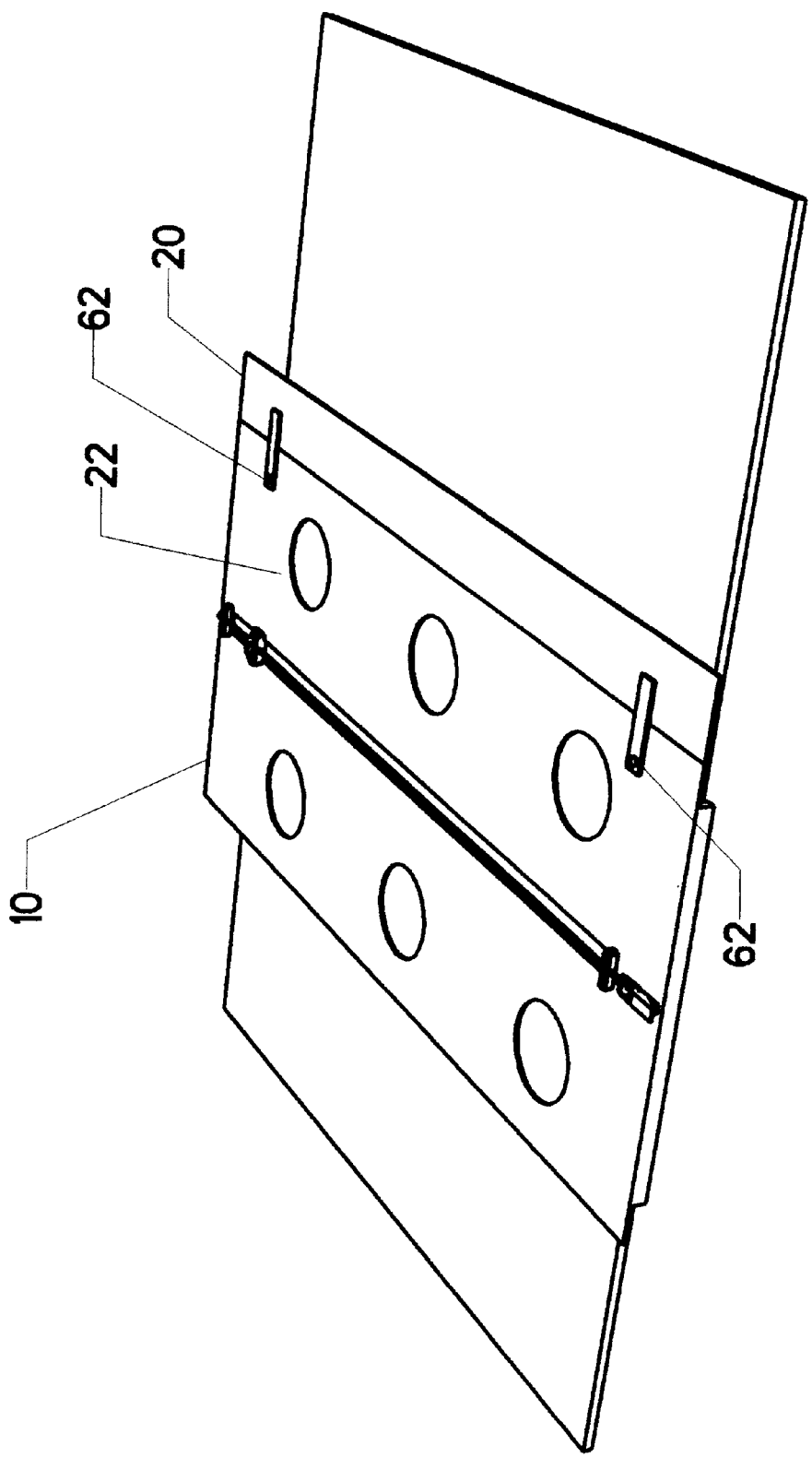
FIG. 3 is a perspective view, showing the operation of the invention.

Those skilled in the art will also know that if square 10 is to be used directly as a saw guide, an allowance must be made for the thickness of the base of the saw itself. FIG. 2 illustrates a common type of circular saw. The reader will observe that the planar base portion of the saw has a substantial width. This fact results in cut 18 being offset a fixed distance from edge guide 14. Turning now to FIG. 3, spacer panel 20 is installed to account for this offset.

The primary structural element of square 10 is flat panel 22. Spacer panel 20 can be attached to flat panel 22 using a pair of pins 62, as shown. Alternatively, spacer panel 20 could be hinged to flat panel 22 so that it can be folded up out of the way when not in use. The width of spacer panel 20 is set to provide the needed offset between edge guide 14 and cut 18. In operation, the user places spacer panel 20 in the position shown in FIG. 3, aligning the right edge of spacer panel 20 with the desired position for the cut. The user then clamps square 10 in place on plywood panel 12. The user then removes spacer panel 20 and runs saw 16 down edge guide 14. The result is that cut 18 will be in the same position previously occupied by the right edge of spacer panel 20.

Different spacer panels 20 may be needed to account for variations in different types of saws. Those skilled in the art will also known that spacer panel 20 could be made in a variety of triangular shapes to provide angled cuts. An adjustable version could also be created. These are concepts well known in the prior art. It is important to bear in mind that the primary innovation of the present invention is its ability to create a true perpendicular reference off of one edge on a piece of flat material.

Figure 4:
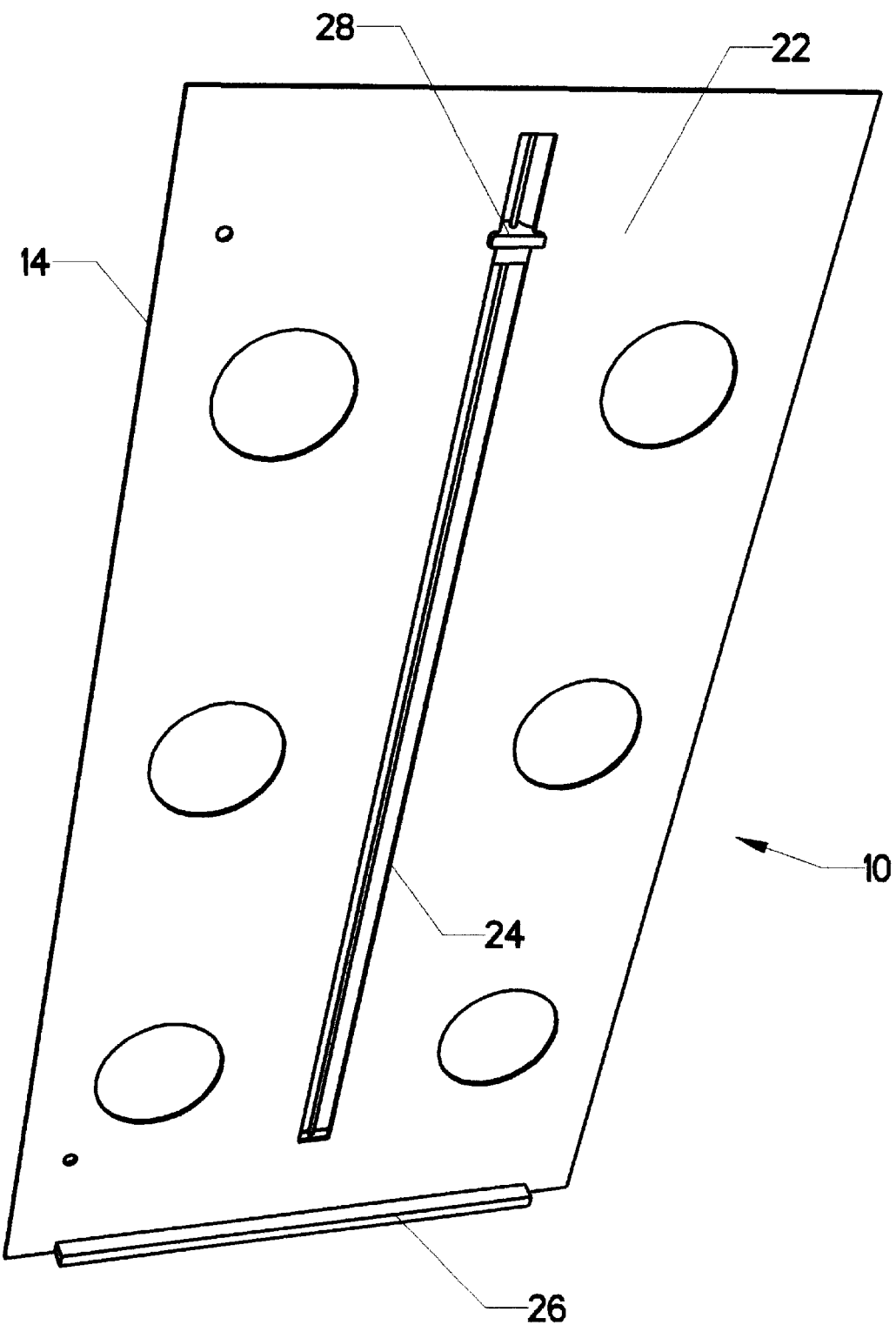
FIG. 4 is a perspective view, showing the underside of the proposed invention.

FIG. 4 shows the underside of square 10. Fixed stop 26 descends downward from flat panel 22. It is positioned to bear against reference edge 64 on plywood panel 12 (Throughout this disclosure, it will be understood that plywood panel 12 is merely a representative type of object. The invention can obviously be used to mark and cut virtually any type of flat material). Fixed stop 26 can assume various shapes. The critical feature is that it must span a sufficient length of reference edge 64 to prevent square 10 from wobbling once it is locked in place. Those skilled in the art will known that a pair of pins—spaced sufficiently far apart—could accomplish the same result. However, the use of an elongated bar—as shown—tends to eliminate errors caused by small indentations in reference edge 64.

Figure 4B:
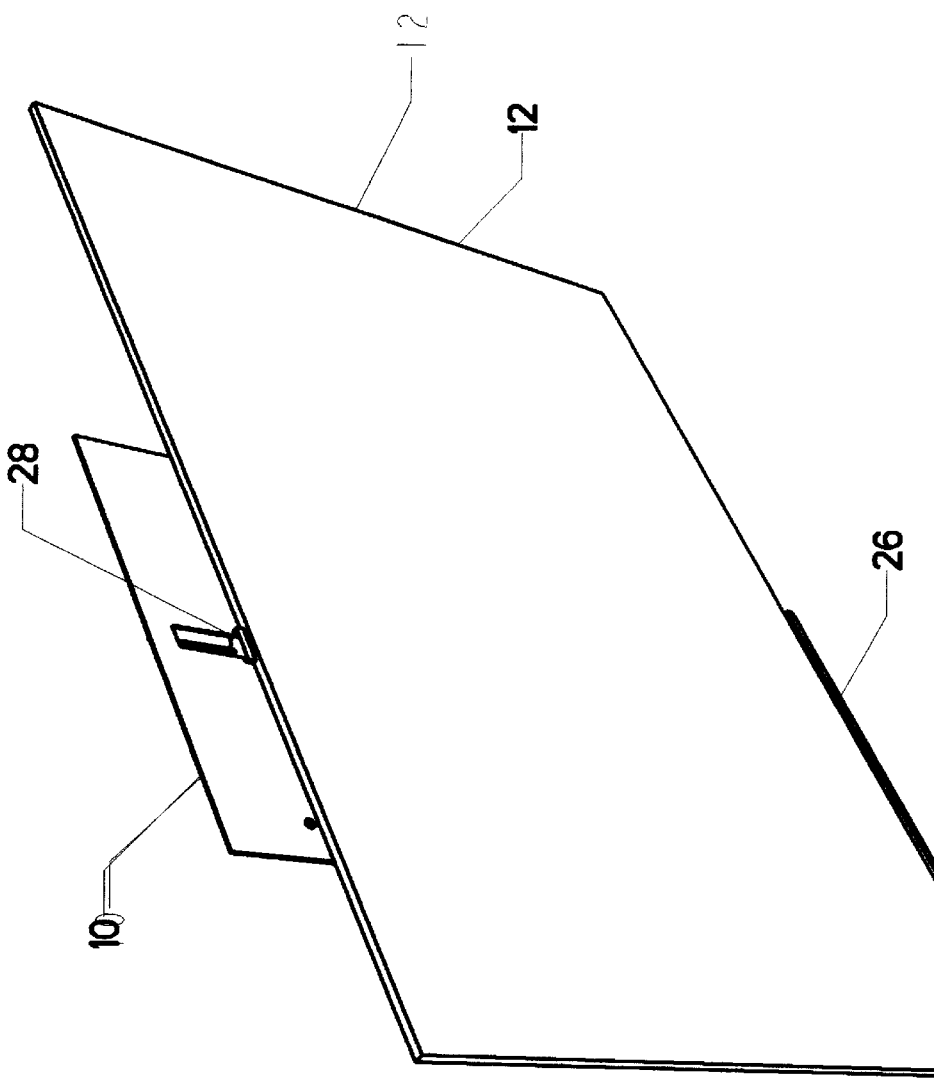
FIG. 4B is a perspective view, showing the invention clamped in place.

Slot 24 passes completely through flat panel 22. It enable a portion of clamp body 28 to extend below flat panel 22. This portion of clamp body 28 is thereby positioned to bear against a second edge of plywood panel 12—one lying opposite to reference edge 64. Returning now to FIG. 1, it will be understood that in use flat panel 22 is laid atop plywood panel 12. Fixed stop 26 is then placed firmly against reference edge 64. Clamp body 28 is then moved toward fixed stop 26 until it comes to rest against back edge 66. Square 10 is then clamped in place, as will be described in the following. FIG. 4B shows square 10 clamped in place on plywood panel 12. The reader will observe how clamp 28 and fixed stop 26 grip opposite sides of the panel.

Figure 5:
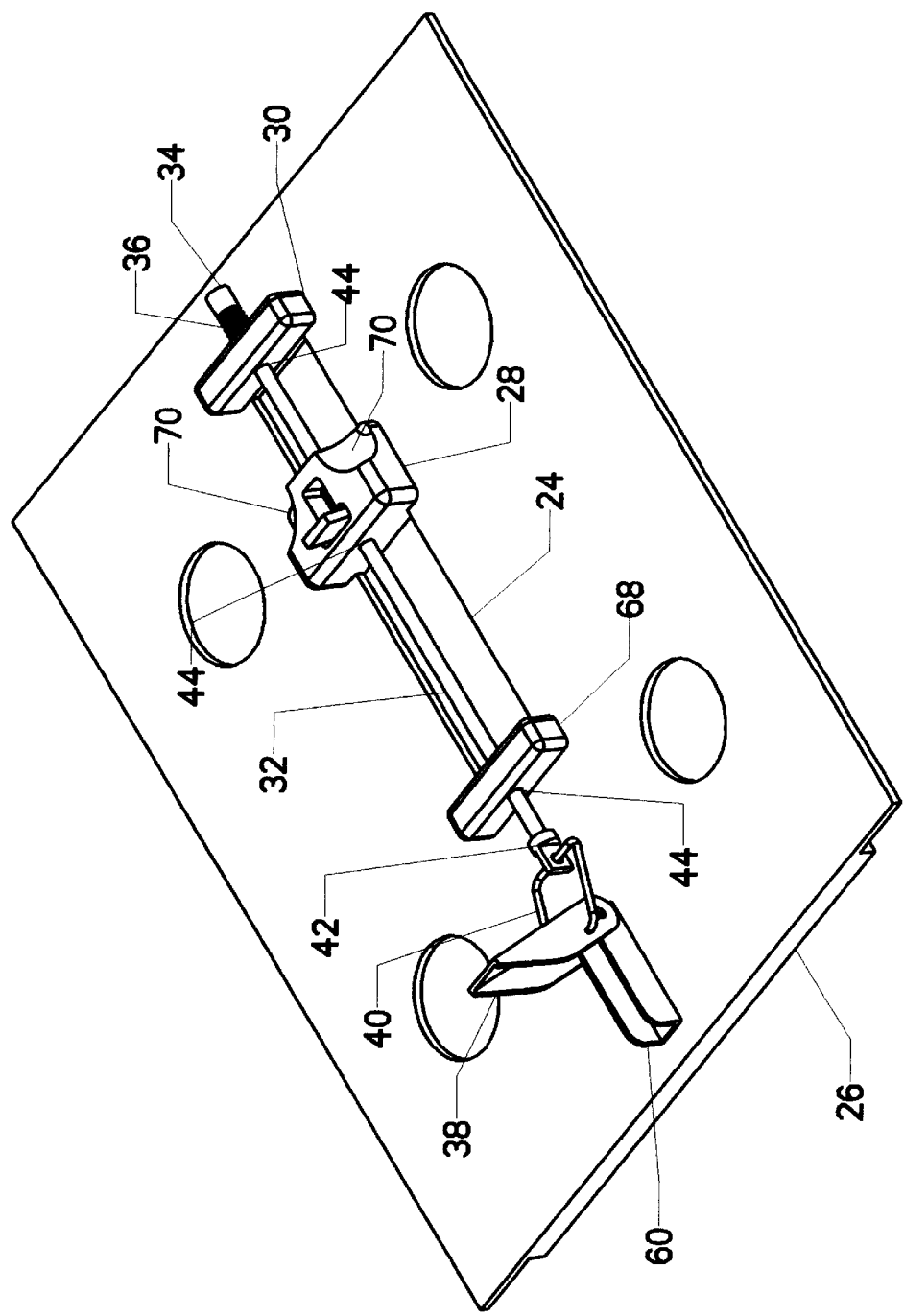
FIG. 5 is an isometric view, showing the details of the adjusting and clamping mechanisms.

FIG. 1 shows the sliding and clamping features of the invention in their normal scale. It is difficult to visualize all the important aspects at such a scale. Accordingly, FIG. 5 presents these features in a compressed format, wherein slot 24 is greatly shortened so as to allow all the components to fit in one view. The configuration shown in FIG. 5 is fully functional, but it would only be able to clamp a panel approximately 10 inches wide. Thus, in use, clamp rod 32 and slot 24 would be much longer. All other features, however, would remain the same.

First tail stop 30 is affixed to flat panel 22 is a position at the far end of slot 24 (with respect to fixed stop 26). Second tail stop 68 is affixed to flat panel 22 in a position at the near end of slot 24 (closest to fixed stop 26). Two aligned through holes 44 pass through first tail stop 30 and second tail stop 68. Clamp rod 32 runs through these two through holes 44. Mechanical clearance is provided so that clamp rod 32 is able to slide back and forth within the through holes 44.

A portion of clamp rod 32 extends out the far side of first tail stop 30. Spring retainer 34 is fastened to the end of this protruding portion. Spring retainer 34 traps clamp spring 36 against first tail stop 30. Thus, clamp spring 36, which is a compressions spring, tends to slide clamp rod 32—along its axis—away from the position of fixed stop 26.

A portion of clamp rod 32 also extends out the near side of second tail stop 68. Coupler 42 is attached to the end of this protruding portion (Those skilled in the art will realize that both spring retainer 34 and coupler 42 could be formed integral with clamp rod 32). Fixed base 60 is attached to flat panel 22 near this point. Fixed base 60 rotatably mounts toggle 38. Toggle 38 is, in turn, connected to coupler 42 by drag link 40. Those skilled in the art will know that when the user presses down on toggle 38, it will pull coupler 42 toward fixed stop 26, thereby pulling clamp rod 32 toward fixed stop 26 and compressing clamp spring 36.

The toggle latch mechanism shown (encompassing fixed base 60, toggle 38, and drag link 40) is quite common in the prior art. It includes an over-center function, meaning that when toggle 38 is fully depressed, the mechanism locks over center and holds considerable tension on coupler 42. Clamp body 28 is locked to clamp rod 32 (in a manner which will be described subsequently). Thus, the preceding describes the clamping function of the invention. With fixed stop butted against reference edge 64, toggle 38 will latch clamp body 28 firmly against back edge 66 of plywood panel 12. Of course, the toggle latch only moves clamp body 28 through a very small range. It cannot accomplish larger adjustments. For these larger adjustments, it is necessary to move clamp body back and forth along clamp rod 32.

Figure 6:
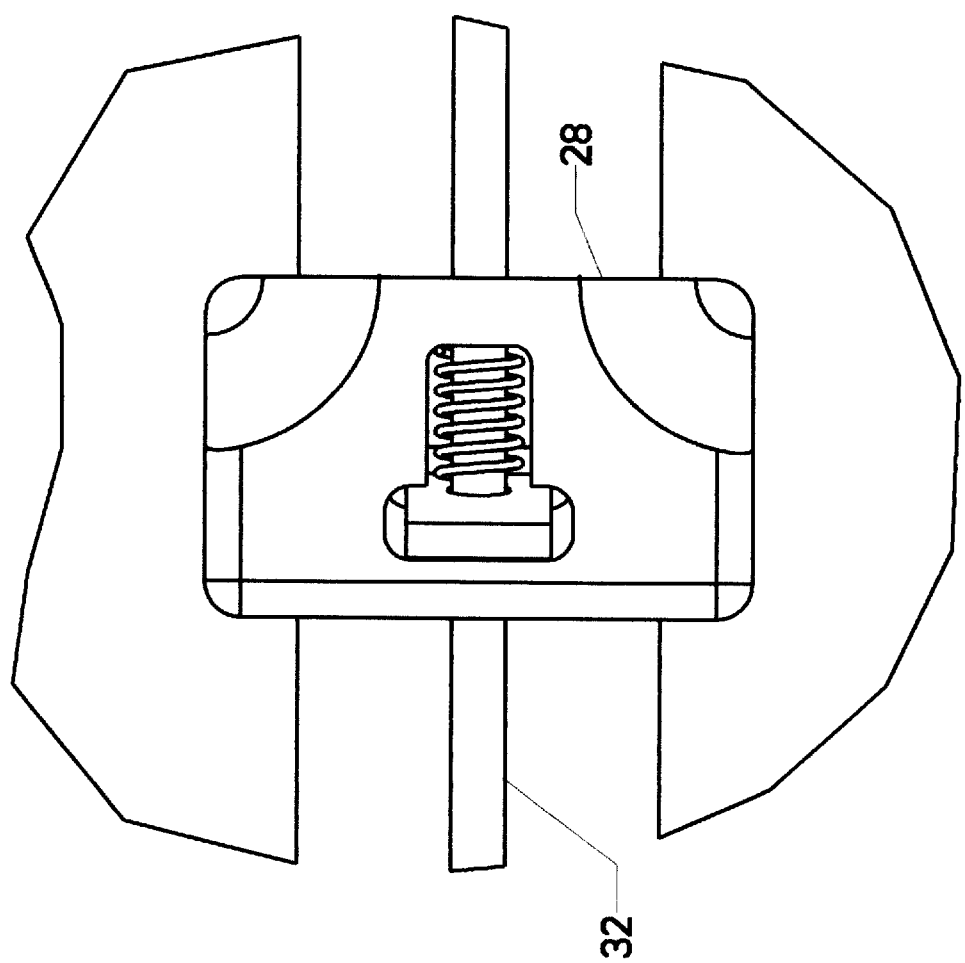
FIG. 6 is a top view, showing the clamp body.
Figure 7:
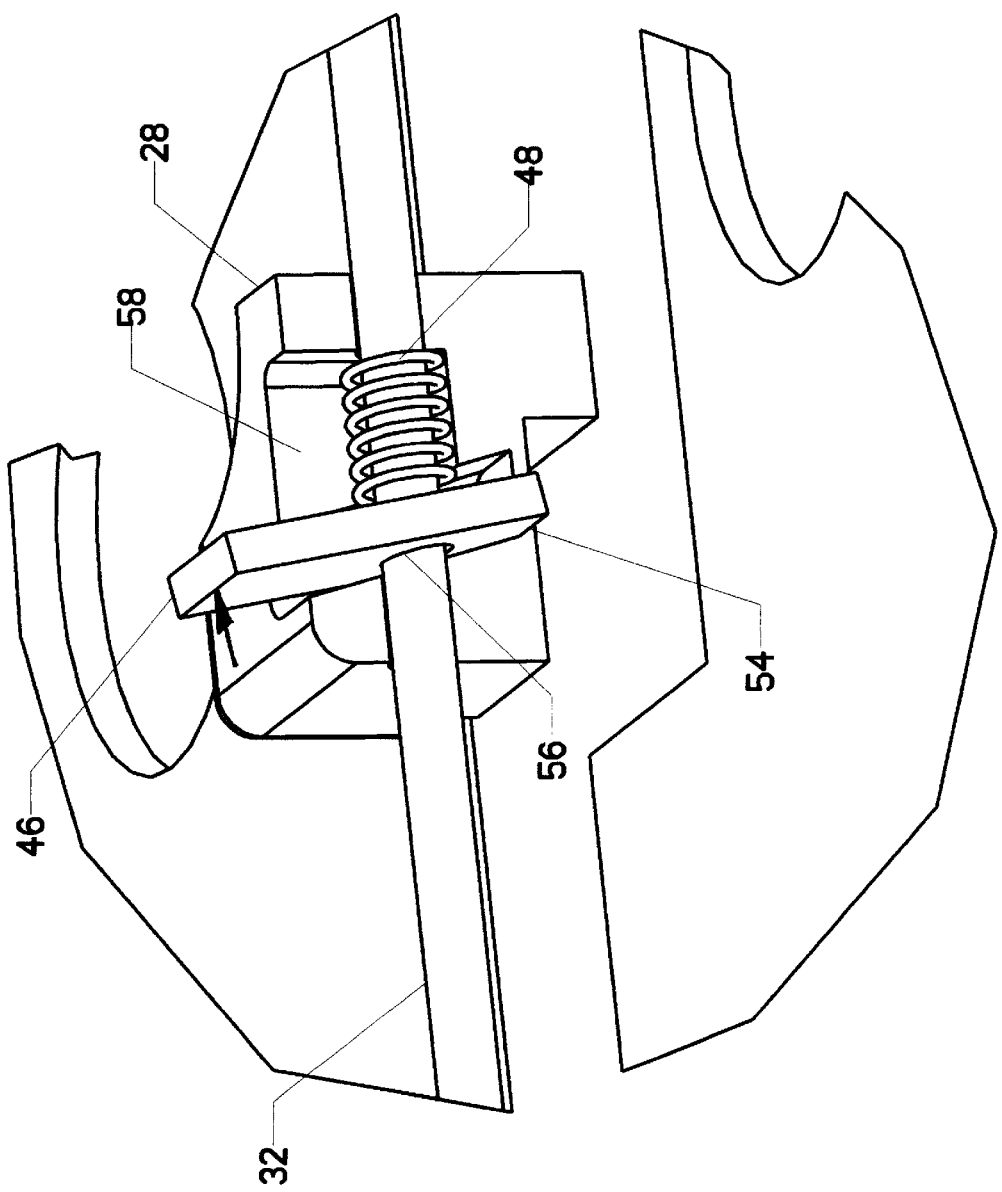
FIG. 7 is a section view, showing some internal features of the clamp body.

FIG. 6 shows a top view of clamp body 28 locked onto clamp rod 32. FIG. 7 shows a sectional view of the assembly. Clamp body 28 opens into lever cavity 58. Clamp rod 32 passes through this cavity. Release lever 46 is mounted on clamp rod 32 by virtue of the fact that clamp rod 32 passes through lever hole 56 in release lever 46. Release lever 46 has an upper end (the top extremity in the view as shown), a lower end, a side proximate said fixed stop 26 (the left side in the view), and a side distal from said fixed stop 26 (the right side in the view as shown).

Clamp body 28 incorporates fulcrum 54 which bears against the lower end of release lever 46 on the side proximate said fixed stop 26. Lock spring 48 tends to rotate the upper end of release lever 46 toward fixed stop 26. Lever hole 56 is slightly larger in diameter than clamp rod 32. The spring force on release lever 46 causes it to rotate, thereby canting lever hole 56 with respect to clamp rod 32. The mechanism disclosed in commonly known in the field of caulking guns. Those skilled in the art will realize that in the configuration shown in FIG. 7, a force exerted on clamp body 28 from left to right (in a direction away from fixed stop 26), will cause the disclosed mechanism to lock clamp body 28 to clamp rod 32—not allowing any relative motion. However, a force exerted on clamp body 28 from right to left (in a direction toward fixed stop 26), will cause release lever 46 to rotate so that lever hole 56 aligns with clamp rod 32. Clamp body 28 will then slide freely along clamp rod 32 from right to left. This feature allows the user to easily adjust the position of clamp body 28.

However, it is also necessary to slide clamp body 28 back to the right in order to allow for clamping of larger flat panels. In order to do this, the user presses on release lever 46 in a position and direction as indicated by the arrow. This action causes lever hole 56 to align with clamp rod 32, thereby allowing clamp body 28 to slide from left to right in the view as shown. Once the user stops pushing on release lever 46, the mechanism will once again lock clamp body 28 to clamp rod 32 so as to resist forces from left to right.

The addition of serrations to clamp rod 32 has been found advantageous, in that they increase friction between clamp rod 32 and release lever 46. The use of a simple threaded shaft for clamp rod 32 is very effective. It is also advantageous to apply a non-slip surface to the clamping faces of fixed stop 26 and clamping surface 52.

Returning briefly to FIG. 5, the interaction of the clamping and adjustment means will be described. In order to return clamp body 28 to its "home position" (furthest away from second tail stop 68, the user presses release lever 46 in a direction away from the viewer in FIG. 5. This pressure releases clamp body 28 and causes it to slide along clamp rod 32 until is comes to a stop against first tail stop 30. Next, the user lifts up on toggle 38. The user then places flat panel 22 on plywood panel 12, with fixed stop 26 against reference edge 64. Next, the user grasps clamp body 28 (using finger notches 70) and pulls it toward fixed stop 26 until clamp body 28 rests against back edge 66. The user then depresses toggle 38 to latch the device in place on plywood panel 12. Edge guide 14 is then ready for use.

To release the device, the user need only lift up on toggle 38. Once is passes the over-center point, the action of clamp spring 36 will pull open the toggle latch and release the device.

Figure 8:
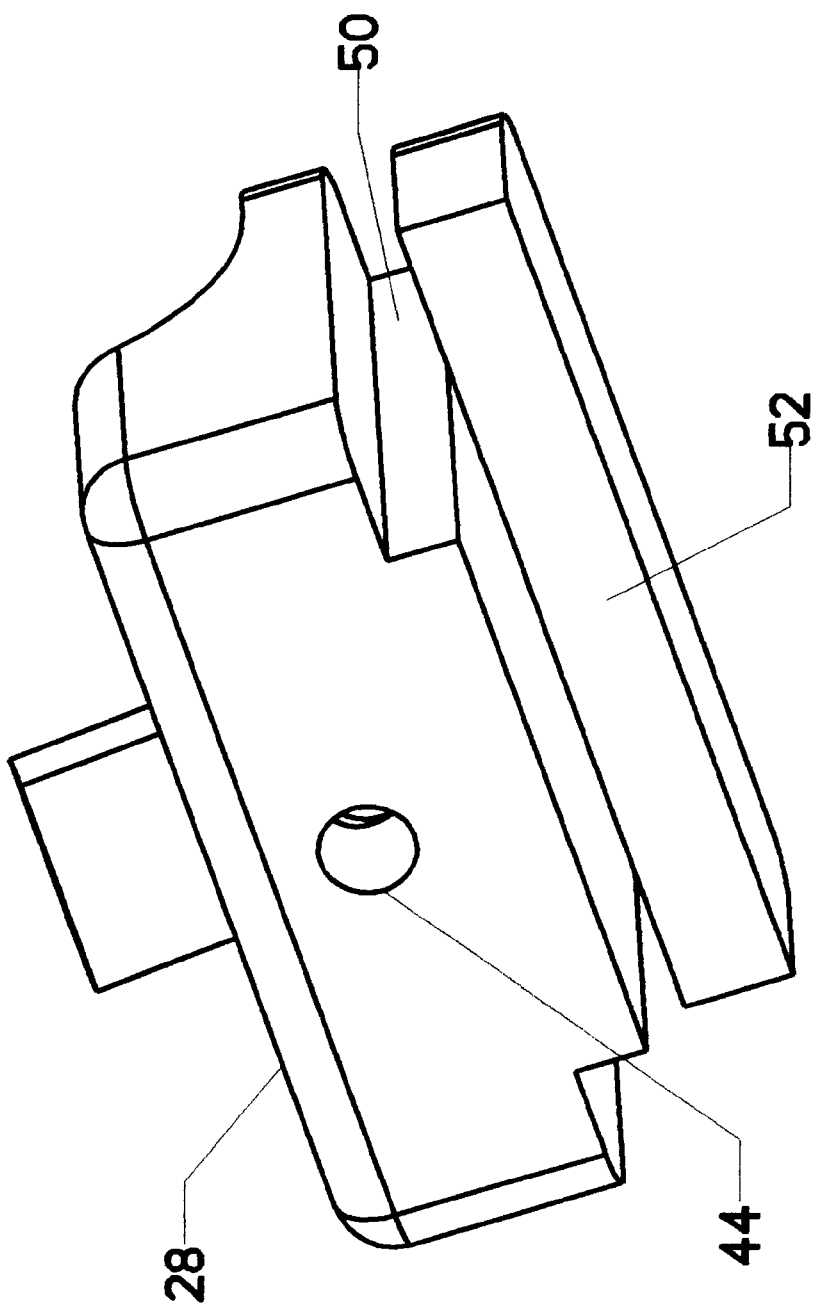
FIG. 8 is an isometric view, showing additional features of the clamp body.

FIG. 8 shows clamp body 28 from another perspective. The reader will observe that two panel grooves 50 are cut into opposing sides. These allow clamp body 28 to ride along the edges of slot 24, as shown in previous views. The reader will also observe that clamping surface 52 (which faces fixed stop 26) extends well below the plane of flat panel 22.

Figure 9:
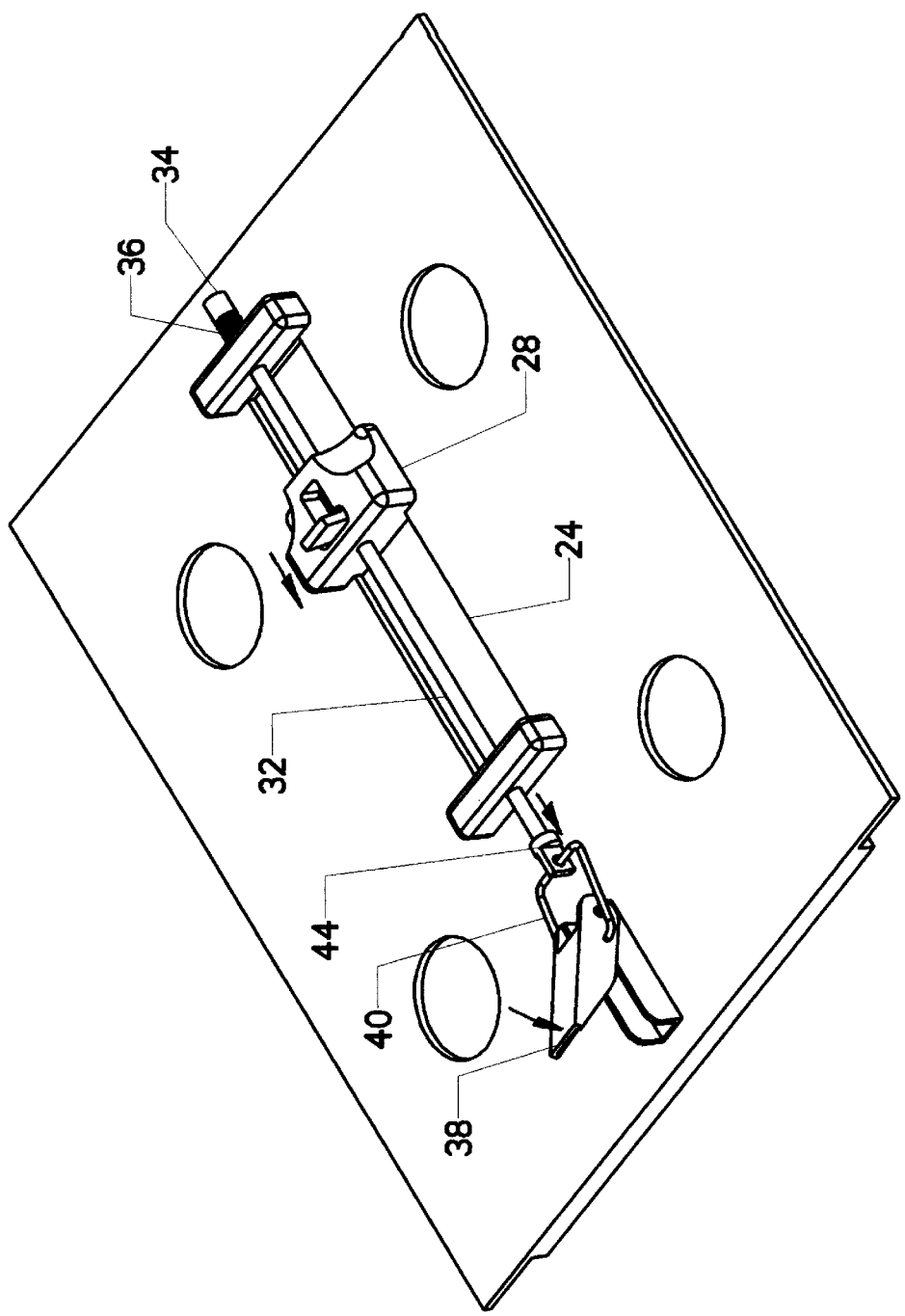
FIG. 9 is a perspective view, showing the adjustment of the invention to fit a particular panel.
Figure 10:
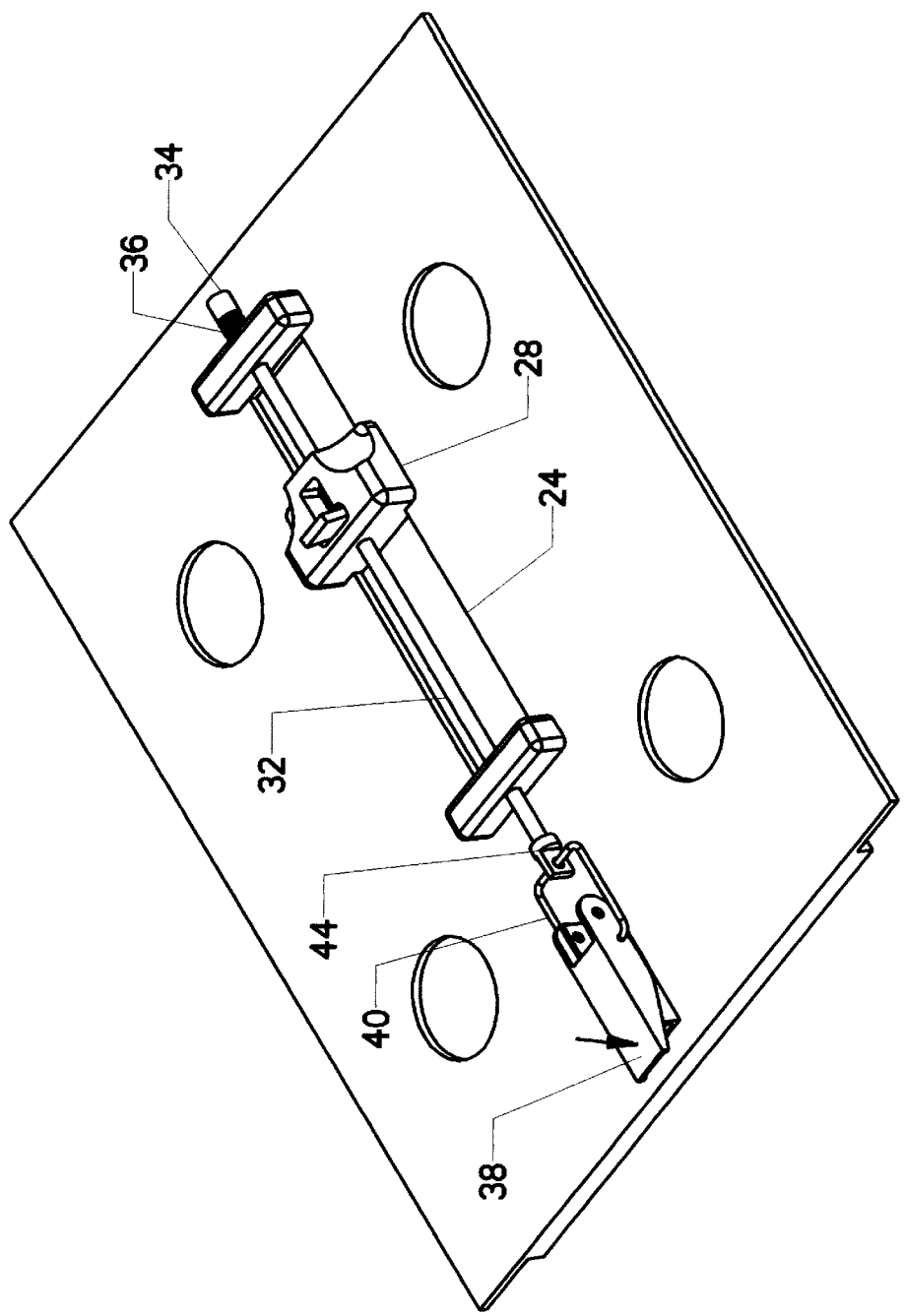
FIG. 10 is a perspective view, showing the actuation of the clamping mechanism.

FIGS. 5, 9, and 10 shows the clamping action in sequence. FIG. 5 shows the unclamped position. FIG. 9 shows the mechanism with toggle 38 partially depressed. FIG. 10 shows the mechanism with toggle 38 fully depressed and locked in place.

Figure 11:
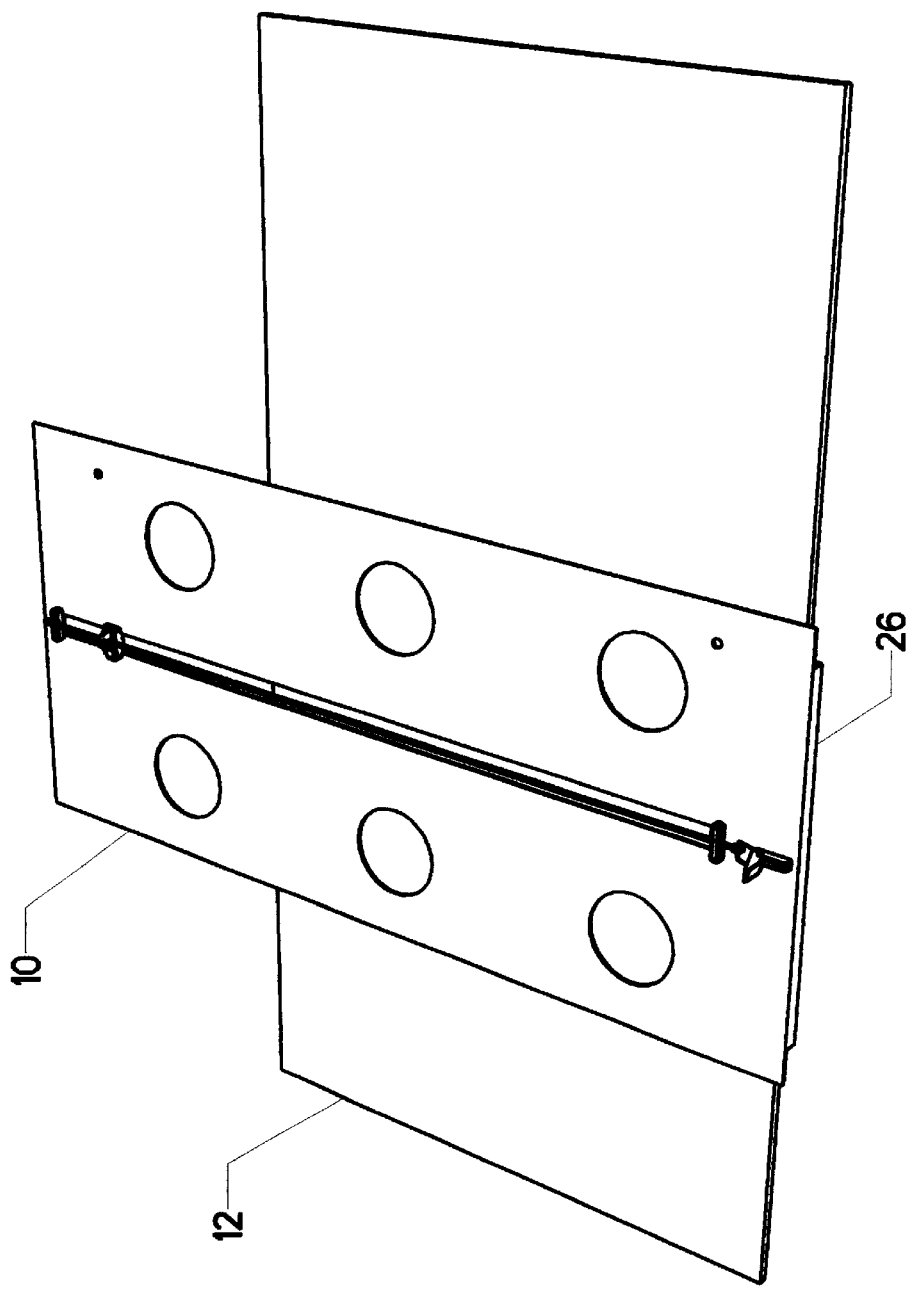
FIG. 11 is a perspective view, showing the operation of the invention.
Figure 12:
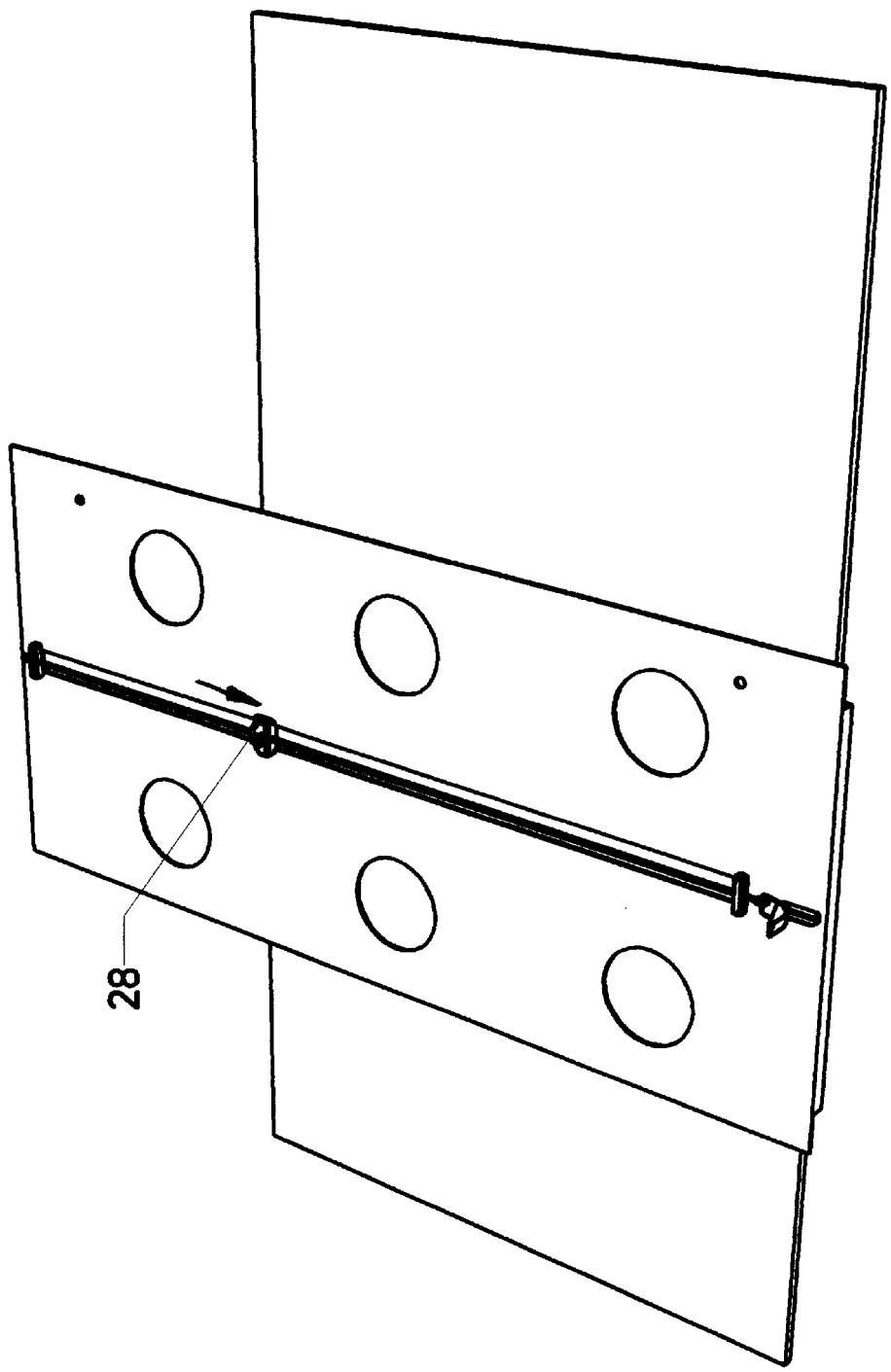
FIG. 12 is a perspective view, showing the operation of the invention.
Figure 13:
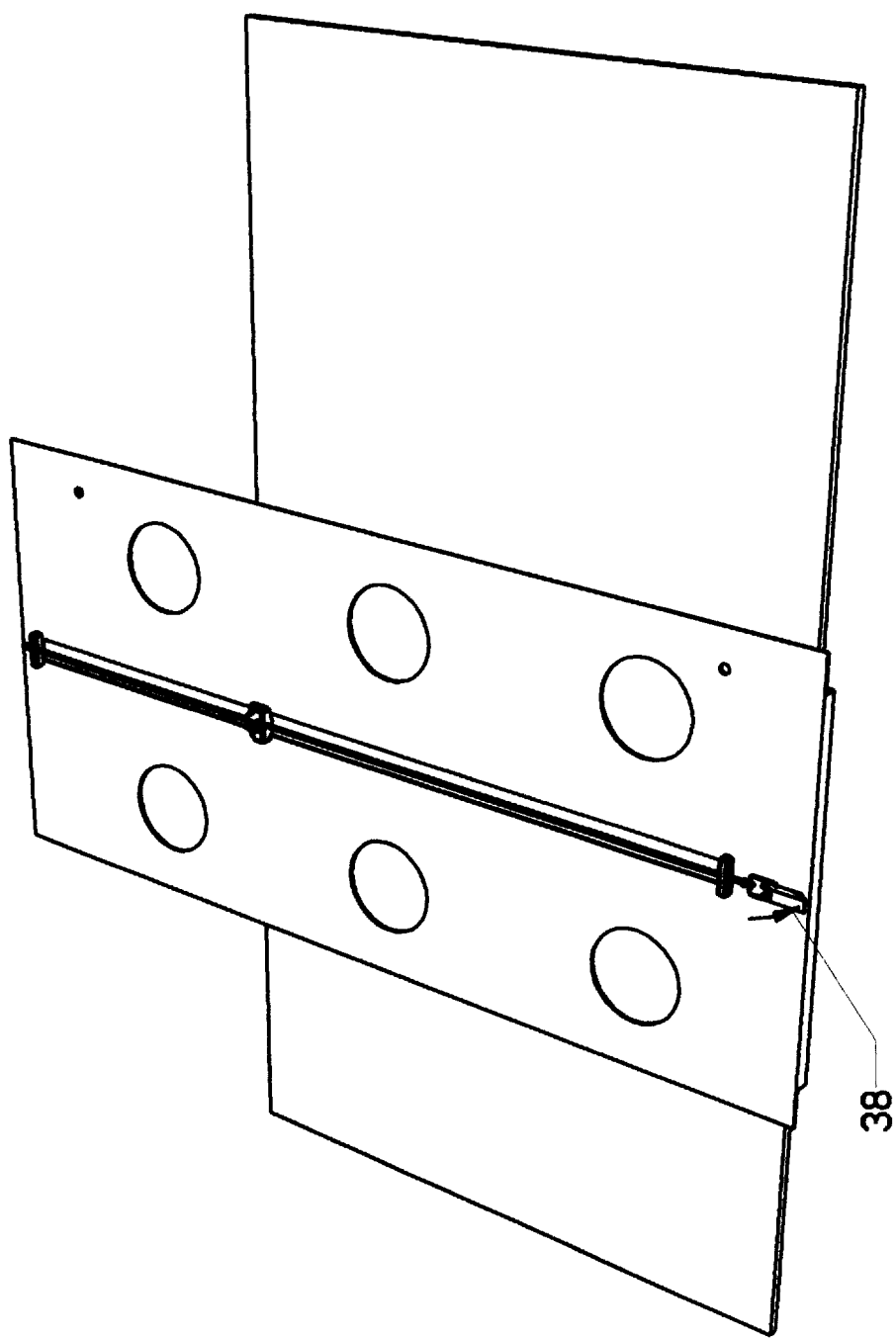
FIG. 13 is a perspective view, showing the operation of the invention.

FIGS. 11, 12, and 13 show the complete installation sequence. In FIG. 11, square 10 is placed on plywood panel 12 with fixed stop 26 butted against reference edge 64. FIG. 12 shows clamp body 28 after it has been moved down against back edge 66. FIG. 13 shows the invention after toggle 38 has been fully depressed, thereby locking the invention in place.

Although the selection of particular construction material is not relevant to the novel aspects of the invention, some discussion may aid the reader's understanding. Flat panel 22 needs to be fairly large for use on 4 foot by 8 foot plywood panels. It can be made 4 feet 6 inches long by 2 feet wide. Thus, the weight of the material elected can be important. The inventor has found simple plastic sheeting to be highly effective. It provides sufficient stiffness while keeping the invention light enough to easily handle.

Returning to FIG. 1, the addition of several large holes 72 can serve to further lighten the device. These are also useful for grasping the invention and hanging it on pegs when it is not in use. The size and position of the holes is simply a matter of design expedience.

Accordingly, the present invention provides a marking and/or cutting square which:

1. Can mark a full cut across a 4 foot panel;
2. Can be fixed in place to leave both the user's hands free; and
3. Can serve as a saw guide.

Although the preceding description contains significant detail, it should not be construed as limiting the scope of the invention but rather as providing illustrations of the preferred embodiment of the invention. Thus, the scope of the invention should be fixed by the following claims, rather than by the examples given.

Having described my invention, I claim:

1. A square allowing a user to mark and cut a planar object wherein said planar object has a first edge, and a second edge approximately parallel to said first edge, comprising:
    a. a flat panel, having at least one straight edge guide;
    b. a fixed stop, descending downward from said flat panel and formed in a shape to bear against said first edge when said flat panel is placed on said planar object so that said edge guide is perpendicular to said first edge;
    c. a clamp rod oriented parallel to said flat panel and perpendicular to said fixed stop;
    d. a clamp body, slidably attached to said clamp rod;
    e. unidirectional locking means, allowing said user to slide said clamp body toward said fixed stop but not away from said fixed stop;
    f. a release lever, mounted on said clamp body which, when actuated, allows said user to slide said clamp body away from said fixed stop; and
    e. clamping means, capable of forcing said clamp body toward said fixed stop so as to clamp said square securely to said planar object while maintaining said edge guide in an orientation which is perpendicular to said first edge.

2. A square as recited in claim 1, wherein said clamp body opens into a lever cavity, and wherein said unidirectional locking means comprises:
    a. wherein said release lever has an upper end, a lower end, a side proximate said fixed stop, and a side distal to said fixed stop;
    b. wherein said release lever opens into a lever hole having a diameter slightly larger than the diameter of said clamping rod, and wherein said lever hole surrounds said clamping rod so as to mount said release lever onto said clamping rod;
    c. wherein said clamp body further comprises a fulcrum, positioned to bear against said lower end of said release lever on said side proximate said fixed stop; and
    d. wherein said clamp body further comprises spring biasing means, positioned to bias said upper end of said release lever toward said fixed stop, so that said lever hole becomes canted with respect to said clamp rod and locks to said clamp rod whenever force is exerted on said clamp body in a direction away from said fixed stop, thereby locking said clamp body in place, but also so that a force exerted on said clamp body in a direction toward said fixed stop will cause said lever hole to align with said clamp rod, thereby allowing said clamp body to slide toward said fixed stop.

3. A square as recited in claim 2, wherein said upper end of said release lever extends well beyond said clamp body, so that said user can press on said release lever in a direction away from said fixed stop, thereby causing said release lever to rotate so that said lever hole aligns with said clamp rod, thereby allowing said clamp body to move away from said fixed stop.

4. A square as recited in claim 3, wherein said clamp rod has a rough surface so as to increase friction between said clamp rod and said lever hole in said release lever.

5. A square as recited in claim 2, wherein said clamp rod has a rough surface so as to increase friction between said clamp rod and said lever hole in said release lever.

6. A square as recited in claim 1, wherein said clamping means comprises:
   a. a first tail stop, fixedly mounted to said flat panel in a position distal to said fixed stop;
   b. a second tail stop, fixedly mounted to said flat panel in a position proximate to said fixed stop;
   c. wherein both of said first and second tail stops open into through holes passing completely therethrough, and wherein said through holes mount said clamp rod in said orientation that is parallel to said flat panel and perpendicular to said fixed stop;
   d. wherein said through holes in said first and second tail stops are large enough to allow said clamp rod to slide back and forth in a direction parallel to its long axis;
   e. wherein a portion of said clamp rod extends beyond said second tail stop toward said fixed stop;
   f. a coupler, formed in said portion of said clamp rod extending toward said fixed stop;
   g. a toggle latch, having a fixed base attached to said flat panel, a toggle, and a drag link attached to said coupler, so that when said user presses down on said toggle, said drag link is pulled toward said fixed stop, thereby pulling said clamp rod and said clamp body attached thereto toward said fixed stop; and
   h. wherein said toggle latch includes an over-center function so that when said toggle is fully depressed, said toggle latch remains in position and said clamp rod remains in position.

7. A square as recited in claim 6, further comprising biasing means tending to bias said clamp rod away from said fixed stop, so that said toggle latch remains open until depressed by said user.

8. A square as recited in claim 2, further comprising a spacer panel, having a first straight edge butted against said edge guide on said flat panel and a second straight edge parallel to said first straight edge, but offset a fixed distance therefrom.

9. A square as recited in claim 8, wherein said spacer panel is hinged to said flat panel so that said user can fold said spacer panel out of the way when not in use.

10. A square as recited in claim 8, wherein said spacer panel is detachably affixed to said flat panel so that it can be removed when not in use.

* * * * *